United States Patent [19]
Benson

[11] 3,797,095
[45] Mar. 19, 1974

[54] BEARING PULLER
[76] Inventor: David E. Benson, 615 W. Sixth St., Belvidere, Ill. 61008
[22] Filed: June 1, 1972
[21] Appl. No.: 258,755

[52] U.S. Cl. .................................. 29/261, 85/33
[51] Int. Cl. ............................................ B23p 19/04
[58] Field of Search ............................. 29/256–266; 85/33

[56] References Cited
UNITED STATES PATENTS
2,697,273   12/1954   Clarke et al. ........................ 29/261
2,789,458   4/1957   Skeisvoll ................................. 85/33
1,075,384   10/1913   Seidel ............................. 29/261 X Primary Examiner—Othell M. Simpson
Assistant Examiner—Harold P. Smith, Jr.
Attorney, Agent, or Firm—Wolfe, Hubbard, Leydig, Voit & Osann, Ltd.

[57] ABSTRACT

A bearing puller having a threaded rod which is normally held in a given vertical position on a crossbar by a collet having spring fingers which may be loosened by turning a nut on the upper end of the collet.

3 Claims, 3 Drawing Figures

PATENTED MAR 19 1974 3,797,095

BEARING PULLER

BACKGROUND OF THE INVENTION

This invention relates to a bearing puller and, more particularly, to the type of bearing puller having a threaded rod extending through the center of a crossbar which supports a pair of pivotable arms. In use, the arms hook beneath the underside of a bearing while the rod is threaded downwardly through the crossbar to cause the bearing to be pulled from the shaft. In some of the prior pullers, a threaded collet normally is held closed around the rod by a nut and may be opened to allow the rod to slide vertically for rough adjustment to engage the shaft. A bearing puller of this type is disclosed in Clarke et al. U.S. Pat. No. 2,697,273.

SUMMARY OF THE INVENTION

The primary object of the present invention is to provide a novel puller of the above general character which is simpler in construction and easier and faster to operate than prior pullers.

A more specific object is to provide a bearing puller in which the collet may be adjusted selectively to release the rod for rough adjustment in length without need of removing the collet from the puller so that the rough adjustment can be made much more quickly and easily than has been possible heretofore.

A more detailed object is to use the crossbar itself to hold the collet closed around the rod so as to reduce the number of parts previously required for similar bearing pullers.

The invention also resides in the novel construction of the bearing puller and specifically in the provision of a nut which coacts with the crossbar to hold the collet upwardly within an opening so that a plurality of resilient fingers on the collet are cammed toward each other by the sides of the opening to grip the rod against sliding vertically, the fingers being biased outwardly to spring apart and release the rod to slide vertically when the collet is pushed partially out of the opening.

These and other objects and advantages of the present invention will become more apparent from the following detailed description when taken in conjunction with the accompanying drawings.

DETAILED DESCRIPTION OF THE PREFERRED EMBODIMENT

Figure 1:
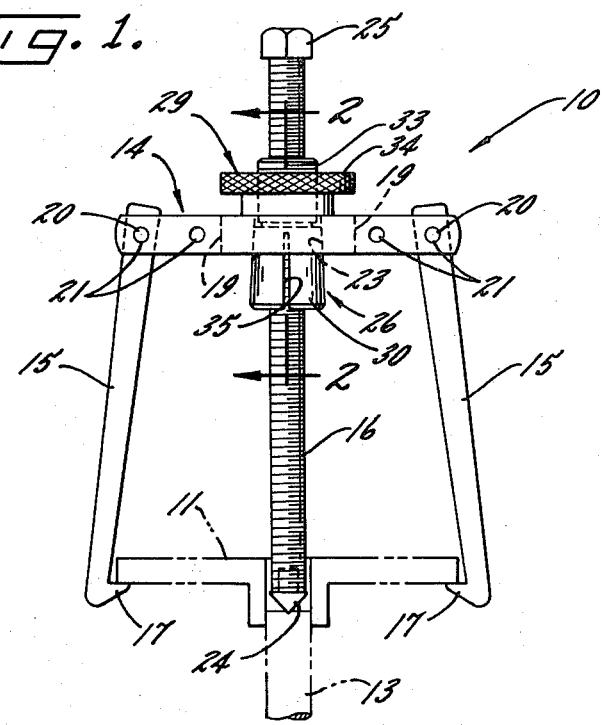
FIG. 1 is an elevational view of a bearing puller embodying the novel features of the present invention.

As shown in the drawings for purposes of illustration, the present invention is embodied in a puller 10 especially suitable for use in removing a member such as a bearing, gear or wheel from a shaft 13, the member herein being shown as a bearing 11. The puller includes a support in the form of an elongated crossbar 14 with arms 15 pivotally attached to opposite ends thereof and with a threaded rod 16 extending vertically through the center of the crossbar. Inwardly extending hooks 17 on the arms catch beneath the bearing while the rod engages the end of the shaft and, as the rod is turned to push against the shaft, the arms pull the bearing from the shaft.

As shown in FIG. 1, the two arms 15 are mounted within generally rectangular slots 19 formed in the opposite ends of the crossbar 14 and are held in the slots by pins 20 which are inserted through holes (not shown) in the upper ends of the arms and through corresponding holes 21 formed through the crossbar. Two pairs of the holes 21 are formed in each end of the crossbar for selective adjustment of the distance between the arms to accommodate bearings of different diameters.

A central opening 23 in the crossbar 14 telescopically receives the rod 16 which extends downwardly from the crossbar to engage the end of the shaft 13. A pointed tip 24 on the lower end of the rod holds the rod against slipping on the shaft by embedding slightly in the shaft. The upper end 25 of the rod is nut-shaped so that the entire rod may be turned with a wrench or the like in order to move the rod axially or vertically with respect to the crossbar.

Figure 2:
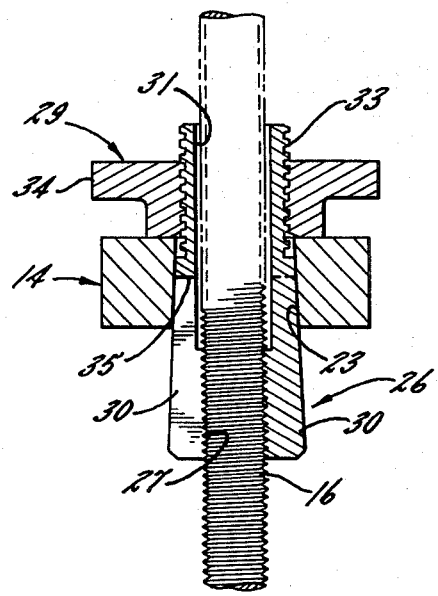
FIG. 2 is an enlarged fragmentary cross-sectional view taken substantially along line 2—2 of FIG. 1.
Figure 3:
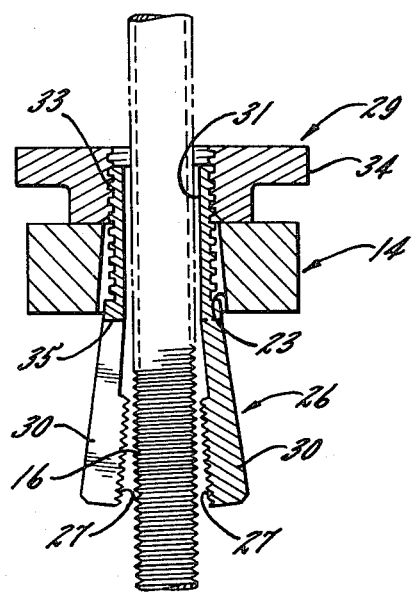
FIG. 3 is an enlarged fragmentary view similar to FIG. 2 but showing parts of the puller in moved positions.

Supporting the rod 16 within the opening 23 is a collet 26 with parts movable between a closed position and an open position (see FIGS. 2 and 3). In the closed position, internal threads 27 of the collet engage and grip the external threads of the rod to support the rod against sliding axially through the opening. A nut 29 tightened down on the collet normally holds the latter closed but the nut may be loosened to allow the collet to be opened so that the rod may be slid axially for an adjustment in the length of rod extending beyond the crossbar 14 to enable the arms 15 to be hooked beneath bearings of different thicknesses.

In accordance with the primary aspect of the present invention, the collet 26 is connected with the crossbar 14 and includes a plurality of resilient fingers 30 adapted selectively to hold the rod 16 against axial sliding and to release the rod to allow the latter to be slid through the crossbar and adjusted for length without removing the collet from around the rod and without disconnecting the collet from the crossbar. For these purposes, the fingers are spring-biased in a direction generally radially away from the axis of the rod but normally are held together to grip the rod with the internal threads or threaded inner faces 27 of the fingers. When released, the fingers spring away from the rod and the threads 27 disengage the threads of the rod to enable the rod to be slid axially for adjustment of the length of the rod extending beyond the crossbar. With this unique engagement, the collet need not be disconnected from the crossbar or from around the rod so that the axial adjustment in the length of the rod extending beyond the crossbar may be made much more quickly and easily than has been possible heretofore.

In the present instance, the collet 26 is a generally cylindrical member telescoped into the central opening 23 and including an axial bore 31 which receives the rod 16. Normally, a threaded upper end portion 33 of the collet projects upwardly beyond the top surface of the crossbar (see FIG. 2) and is held within the opening 23 by the nut 29. The latter includes a radial flange 34 projecting outwardly from its upper end, a knurled outer surface being formed on the flange for hand gripping to tighten and loosen the nut against the crossbar 14 so as to draw the collet up into the opening and to release the collet for moving downwardly in the opening.

The lower end of the collet 26 includes the fingers 30, herein four, which are defined by four angularly spaced slots 35 extending through the walls of the collet to open into the axial bore 31. As shown in FIG. 1, the slots 35 are elongated in a vertical direction extending generally parallel to the central axis of the collet. The fingers thus are formed with lower free ends and with upper ends integrally connected with the upper end portion 33 approximately midway between the opposite ends of the collet.

Advantageously, the threads 27 are cut adjacent the lower ends of the fingers 30 in the inner faces thereof for interengaging with the threads on the rod 16 below the lower surface of the crossbar 14. Moreover, the fingers are spring-tempered with the free ends biased radially away from the central axis of the collet 26 to assume relaxed positions in which the fingers collectively flare away from the rod. When the fingers are relaxed, the diameter of the axial bore 31 between the fingers is greater than the diameter of the rod (see FIG. 3) so that the rod may slide freely through the collet. But, as shown in FIG. 2, the collet is normally held upwardly within the opening 23 of the crossbar by the nut 29 and, in this position, the fingers are cammed toward each other by the sides of the opening 23 so that the threads 27 of the fingers interengage with the threads on the rod. More particularly, the sides of the opening 23 slant inwardly toward the central axis thereof upon progressing upwardly from the bottom surface of the crossbar 14. The outer surfaces of the fingers also are formed on a slant and taper towards each other upon progressing upwardly from the free ends of the fingers. Accordingly, the farther the collet is drawn into the opening 23, the more the fingers are cammed toward each other to grip the rod and hold it against axial sliding.

With the exemplary puller 10, the length of the rod 16 projecting below the crossbar 14 can be adjusted quickly and easily and without having to remove the collet 26 from around the rod or off the crossbar. This may be accomplished by unscrewing the nut 29 upwardly on the collet to loosen the nut from the crossbar. Then the collet may be pushed downwardly by simply pushing the rod downwardly until the collet dislodges from opening far enough to allow the fingers to spring into their relaxed positions away from the rod. Thereafter, the rod can be adjusted as desired for length by sliding it axially in the desired direction and, once in position, the nut again may be tightened down on the crossbar to draw the collet upwardly into the opening 23. The fingers 30 thus close on and grip the rod to lock the threads 27 against the threads on the rod so as to hold the rod preparatory to being turned to pull the bearing 11 loose from the shaft 13 with the arms 15.

I claim as my invention:

1. A puller for removing a member from a shaft and including a support, two arms having upper ends mounted pivotally on said support and having hooked lower ends for catching under the member, a threaded rod extending through an opening in the support, a collet telescoped over said rod and into said opening, a plurality of spring fingers integrally formed with the lower end of said collet and extending downwardly from the underside of said support, said fingers having threaded inner faces and being biased toward relaxed positions spaced from engagement with said rod, and means for pulling said collet upwardly into said opening whereby said fingers are constrained against said rod, said means being movable to permit said collet to be lowered within said opening to release the fingers to spring into said relaxed positions to enable the rod to be slid axially within said collet to adjust the length of the rod extending beyond the support.

2. A puller as defined by claim 1 wherein the upper end of said collet protrudes from the upper surface of said support and is externally threaded, said means including a nut normally threaded on the upper end of said collet and engaging the upper surface of the support to hold the collet upwardly within said opening with the sides thereof camming the fingers together so that the inner faces threadably engage the rod.

3. A puller for removing a member from a shaft and including an elongated cross bar with a central opening, two arms having upper ends mounted pivotally at opposite ends of said crossbar and having hooked lower ends for catching under the member, a threaded rod extending through said opening, a collet telescoped over said rod and into said opening and including an externally threaded upper end extending upwardly beyond the upper surface of the crossbar, a plurality of spring fingers integrally formed with the lower end of said collet and extending downwardly beyond the lower surface of the crossbar, said fingers having threaded inner faces and being prestressed to assume relaxed positions collectively flaring away from the rod, and a nut normally threaded on the upper end of the collet and engaging the upper surface of the crossbar to hold the collet upwardly within said opening with the sides thereof camming the fingers together so that the inner faces threadably engage the rod to support the latter on the crossbar, said nut being adapted to be loosened on the collet to free said collet to slide vertically in the opening and free said fingers to spring into said relaxed positions to enable the rod to be slid vertically through the collet to adjust the length of the rod extending beyond the crossbar.

* * * * *